(12) United States Patent
Taoka et al.

(10) Patent No.: US 10,559,102 B2
(45) Date of Patent: Feb. 11, 2020

(54) MAKEUP SIMULATION ASSISTANCE APPARATUS, MAKEUP SIMULATION ASSISTANCE METHOD, AND NON-TRANSITORY COMPUTER-READABLE RECORDING MEDIUM STORING MAKEUP SIMULATION ASSISTANCE PROGRAM

(71) Applicant: Panasonic Intellectual Property Management Co., Ltd., Osaka (JP)

(72) Inventors: Hiroki Taoka, Kyoto (JP); Tetsuro Sato, Kanagawa (JP); Sachiko Takeshita, Tokyo (JP); Rieko Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 43 days.

(21) Appl. No.: 15/975,876

(22) Filed: May 10, 2018

(65) Prior Publication Data

US 2018/0260983 A1    Sep. 13, 2018

Related U.S. Application Data

(63) Continuation of application No. PCT/JP2016/004420, filed on Sep. 30, 2016.

(30) Foreign Application Priority Data

Dec. 28, 2015    (JP) .................................. 2015-256989

(51) Int. Cl.
G06Q 30/06    (2012.01)
G06Q 30/02    (2012.01)
(Continued)

(52) U.S. Cl.
CPC .............. *G06T 11/20* (2013.01); *A45D 44/00* (2013.01); *A45D 44/005* (2013.01);
(Continued)

(58) Field of Classification Search
CPC ........... G06T 11/00; G06T 2207/30201; G06T 2207/20212; G06Q 30/0631;
(Continued)

(56) References Cited

U.S. PATENT DOCUMENTS

2003/0007071 A1    1/2003    Goto
2016/0000209 A1    1/2016    Yamanashi et al.
(Continued)

FOREIGN PATENT DOCUMENTS

JP    2002-092023    3/2002
JP    2011-022733    2/2011
(Continued)

OTHER PUBLICATIONS

International Search Report of PCT application No. PCT/JP2016/004420 dated Dec. 20, 2016.

*Primary Examiner* — Ke Xiao
*Assistant Examiner* — Andrew Shin
(74) *Attorney, Agent, or Firm* — Greenblum & Bernstein, P.L.C.

(57) ABSTRACT

A makeup simulation assistance apparatus includes: a simulation image generator that generates a simulation image obtained by superimposing, on a facial image picked up by an image pickup unit that picks up an image of a face of a user as the facial image, a makeup image showing a state of makeup as being applied to a facial component of the face; a simulation image output unit that outputs the generated simulation image; an interest degree sensor that senses an interest degree of the user for the makeup image, based on a facial image picked up by the image pickup unit when the
(Continued)

simulation image is output; and an interest degree information output unit that outputs interest degree information indicative of the sensed interest degree.

12 Claims, 8 Drawing Sheets

(51) Int. Cl.
    *G06K 9/00*      (2006.01)
    *A45D 44/00*      (2006.01)
    *G06T 11/20*      (2006.01)
    *G06T 11/00*      (2006.01)
    *G06T 11/80*      (2006.01)

(52) U.S. Cl.
    CPC ......... *G06K 9/00268* (2013.01); *G06Q 30/02* (2013.01); *G06Q 30/06* (2013.01); *G06T 11/00* (2013.01); *G06T 11/80* (2013.01); *A45D 2044/007* (2013.01)

(58) Field of Classification Search
    CPC ........... G06Q 30/0633; G06Q 30/0641; G06Q 30/0643; G06Q 30/0282; G06K 9/00268; G06K 9/00302; G06K 9/00221; A45D 44/005; A45D 2044/007; G06F 2203/011
    See application file for complete search history.

(56) References Cited

U.S. PATENT DOCUMENTS

| | | | |
|---|---|---|---|
| 2016/0260143 A1* | 9/2016 | Ekambaram | G06K 9/00302 |
| 2017/0178220 A1* | 6/2017 | Chong | G06Q 30/0631 |

FOREIGN PATENT DOCUMENTS

| | | |
|---|---|---|
| JP | 2011-096230 | 5/2011 |
| JP | 2014-166218 | 9/2014 |
| JP | 2014-191813 | 10/2014 |
| JP | 2014-194617 | 10/2014 |

* cited by examiner

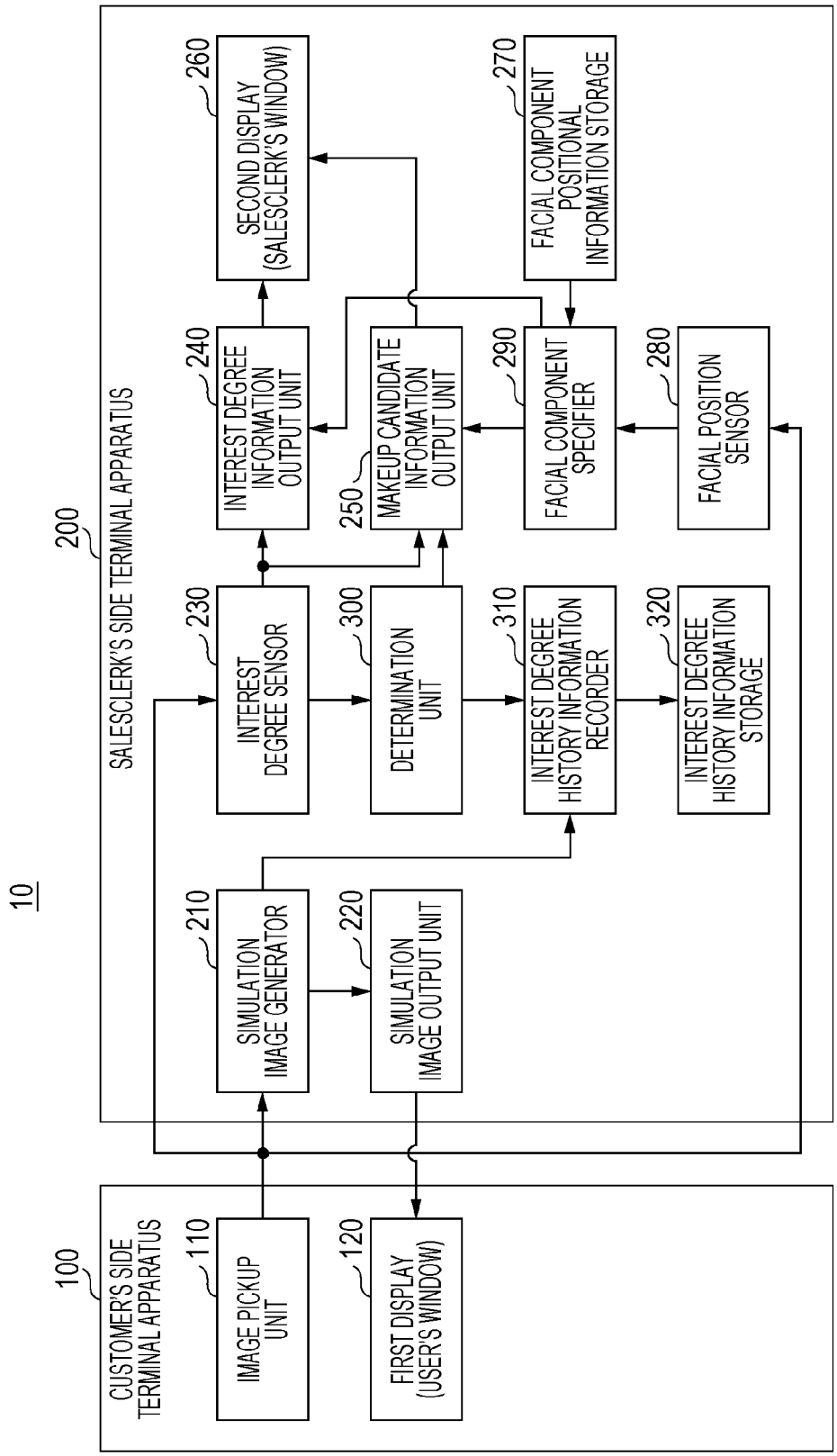

FIG. 3

| DATE OF VISIT | SITE (FACIAL COMPONENT) | INTEREST DEGREE |
|---|---|---|
| ... | EYES | HIGH |
| ... | NOSE | LOW |
| ... | CHEEKS | LOW |
| ... | LIPS | LOW |
| ... | ... | ... |

FIG. 4

| KEY PERSON | INTERESTED PORTION | SATISFACTION DEGREE (EVALUATION) | CANDIDATE FOR MAKEUP RECOMMENDED TO APPLY NEXT |
|---|---|---|---|
| USER | MAKEUP PORTION | HIGH | MAKEUP PORTION (OTHER MAKEUP ALSO RECOMMENDED) |
| USER | MAKEUP PORTION | LOW | MAKEUP PORTION (OTHER MAKEUP RECOMMENDED) |
| USER | NON-MAKEUP PORTION | HIGH | MAKEUP PORTION +INTERESTED PORTION |
| USER | NON-MAKEUP PORTION | LOW | INTERESTED PORTION |
| SALESCLERK | MAKEUP PORTION | HIGH | MAKEUP PORTION (OTHER MAKEUP ALSO RECOMMENDED) |
| SALESCLERK | MAKEUP PORTION | LOW | MAKEUP PORTION (OTHER MAKEUP RECOMMENDED) |
| SALESCLERK | NON-MAKEUP PORTION | HIGH | MAKEUP PORTION +INTERESTED PORTION |
| SALESCLERK | NON-MAKEUP PORTION | LOW | INTERESTED PORTION |

FIG. 5A

| DATE OF VISIT | MAKEUP PART | COLOR | KEY PERSON | SATISFACTION DEGREE (EVALUATION) | PURCHASE RESULT |
|---|---|---|---|---|---|
| ... | BLUSHER | PINK | SALESCLERK | 4 | ○ |
| ... | LIPSTICK | RED | SALESCLERK | 2 | × |
| ... | LIPSTICK | ROSE | SALESCLERK | 1 | × |

FIG. 5B

| DATE OF VISIT | MAKEUP PART | COLOR | KEY PERSON | SATISFACTION DEGREE (EVALUATION) | PURCHASE RESULT |
|---|---|---|---|---|---|
| ... | BLUSHER | PINK | SALESCLERK | 4 | ○ |
| ... | BLUSHER | ORANGE | USER | 2 | × |
| ... | LIPSTICK | RED | SALESCLERK | 2 | × |
| ... | LIPSTICK | PINK | USER | 5 | × |
| ... | LIPSTICK | ROSE | SALESCLERK | 1 | × |

MAKEUP SIMULATION ASSISTANCE APPARATUS, MAKEUP SIMULATION ASSISTANCE METHOD, AND NON-TRANSITORY COMPUTER-READABLE RECORDING MEDIUM STORING MAKEUP SIMULATION ASSISTANCE PROGRAM

BACKGROUND

1. Technical Field

The present disclosure relates to a makeup simulation assistance apparatus, a makeup simulation assistance method, and a non-transitory computer-readable recording medium storing a makeup simulation assistance program.

2. Description of the Related Art

Manufacturers that manufacture and sell cosmetics as an exemplary product relating to makeup often employ a selling model of developing an original retail cosmetics shop in a department store or a supermarket (shop in shop), and selling products through conversations with customers, i.e., by so-called face-to-face selling. In the face-to-face selling of cosmetics, for example, a beauty advisor (BA) of a retail cosmetics shop observes the skin or the like of a customer to give counsel based on the observation result, and selects cosmetics assumed to be the most suitable for the customer.

Conventionally, at retail cosmetics shops, various tools for assisting in face-to-face selling of beauty advisors have been used. As an exemplary tool for assisting in face-to-face selling of a beauty advisor, there is proposed a technique of simulating the customer's face with makeup on a computer without actually applying makeup on the customer's face (for example, see PTL 1).

In the technique disclosed in PTL 1, a facial feature analysis and a skin color analysis of the user's face are conducted based on a picked-up image of the user's face. Based on the result of the facial feature analysis and that of the skin color analysis, information on products suitable for the facial feature and the skin color of the user's face is displayed, and a simulated user's face with virtual makeup using the products is displayed.

CITATION LIST

Patent Literature

PTL 1: Unexamined Japanese Patent Publication No. 2011-22733

As the technique disclosed in PTL 1, various tools assisting in face-to-face selling are developed in order to ultimately lead customers to purchase of cosmetics. However, practically, use of such various tools assisting in face-to-face selling unfortunately fails to lead the customer to purchase of cosmetics unless the beauty advisor identifies latent needs of the customer for makeup and provides information that the customer wants by bringing out a customer's concern relating to makeup. Practically, whether a beauty advisor can identify latent needs of a customer for makeup and efficiently lead the customer to purchase of the cosmetics largely depends on the experience and skill of the beauty advisor. Furthermore, in order to identify the latent needs of the customer for makeup, it may be possible for a salesclerk to ask a customer questions. However, a salesclerk attending on a customer often cannot afford the time for providing such a service. While it has been conventionally proposed to actively simulate virtual makeup in selling cosmetics, such technique only provides displaying the drawing result, and sensing the honest feeling of the customer depends on the skill of the salesclerk.

The above problems are not specific to the situation where a beauty advisor (BA) is in face-to-face selling. In the distribution industry of cosmetics, the proportion of shops in which a customer determines on his/her own and purchases cosmetics and stay-at-home shopping via the Internet and the like (hereinafter referred to as no-salesclerk-selling) is increasing. Accordingly, it is assumed that there is an increasing demand for an apparatus or a program not just performing simulation of makeup, but also assisting in identifying the latent needs of a customer or in making a decision.

SUMMARY

One non-limiting and exemplary embodiment provides a makeup simulation assistance apparatus, a makeup simulation assistance method, and a non-transitory computer-readable recording medium storing a makeup simulation assistance program, each assisting in face-to-face selling and no-salesclerk-selling in order to efficiently derive purchase of a product relating to makeup.

In one general aspect, the techniques disclosed here feature a makeup simulation assistance apparatus including: a simulation image generator that generates a simulation image obtained by superimposing, on a facial image picked up by an image pickup unit that picks up an image of a face of a user as the facial image, a makeup image showing a state of makeup as being applied to a facial component of the face; a simulation image output unit that outputs the simulation image being generated; an interest degree sensor that senses an interest degree of the user for the makeup image, based on a facial image picked up when the simulation image is output; and an interest degree information output unit that outputs interest degree information indicative of the interest degree being sensed.

The present disclosure can assist in face-to-face selling and no-salesclerk-selling to efficiently derive purchase of a product relating to makeup.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Note that, these generic or specific aspects may be realized as a system, an apparatus, a method, an integrated circuit, a computer program, or a recording medium, or as an arbitrary combination of a system, an apparatus, a method, an integrated circuit, a computer program, and a recording medium.

BRIEF DESCRIPTION OF THE DRAWINGS

FIG. 1 is a block diagram showing a functional configuration of a makeup simulation system in face-to-face selling according to a present exemplary embodiment;

FIG. 3 is a table showing interest information according to the present exemplary embodiment;

FIG. 4 is a makeup candidate determination table according to the present exemplary embodiment;

FIG. 5A is a table showing user information according to the present exemplary embodiment;

FIG. 5B is a table showing user information according to the present exemplary embodiment;

DETAILED DESCRIPTION

Figure 2A:
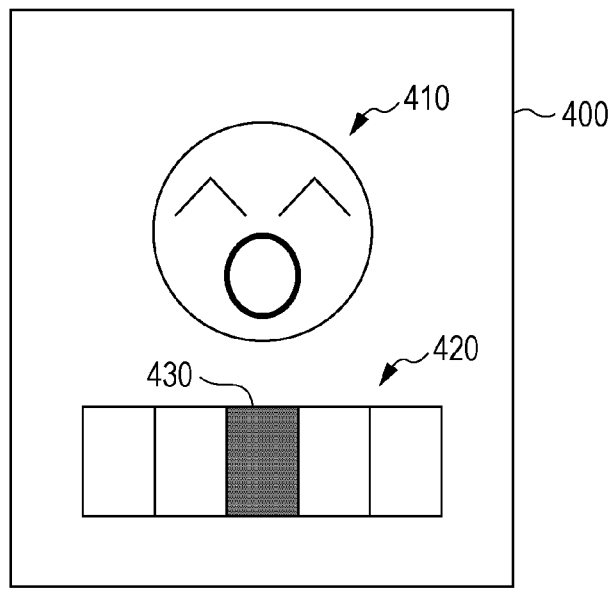
FIG. 2A is an exemplary display mode of a user's window in a makeup simulation.

In the following, with reference to the drawings, a detailed description will be given of a present exemplary embodiment. FIG. 1 is a block diagram showing a functional configuration of makeup simulation system 10 according to an exemplary embodiment of the present disclosure. Makeup simulation system 10 is used, for example, as a tool for assisting in face-to-face selling of a beauty advisor (hereinafter referred to as the "salesclerk") at a retail cosmetics shop, that is, the selling manner that sells products through conversations with a customer (corresponding to the "user" in the present disclosure, hereinafter referred to as the "user").

Makeup simulation system 10 includes customer's side terminal apparatus 100 (a tablet terminal) and salesclerk's side terminal apparatus 200 (a graphic tablet terminal) connected to each other through a communication line. Customer's side terminal apparatus 100 is, for example, installed in portrait orientation opposing to the user, and displays a simulation image of a face with makeup using the user's face. Salesclerk's side terminal apparatus 200 assists in face-to-face selling to efficiently lead the customer to purchase of a product relating to makeup (cosmetics), when customer's side terminal apparatus 100 displays the simulation image. Note that, customer's side terminal apparatus 100 is not specified to a tablet terminal, and may be fixed to the counter in the retail cosmetics shop.

Customer's side terminal apparatus 100 (corresponding to the "makeup simulation assistance apparatus" of the present disclosure) includes image pickup unit 110 and first display 120.

Note that, while not shown in the drawings, customer's side terminal apparatus 100 includes an illumination unit as illumination means, a flash unit as flash means, and a microphone unit as microphone means. Further, while not shown in the drawings, customer's side terminal apparatus 100 further includes, for example, a CPU (Central Processing Unit) as a processor, a storage medium such as ROM (Read Only Memory) storing any control program, work memory such as RAM (Random Access Memory), and a communication circuit. In this case, the functions of the above-described units are realized by the CPU executing the control program.

Image pickup unit 110 picks up an image of the user's face as a facial image. Image pickup unit 110 may be, for example, a CMOS (Complementary Metal-Oxide Semiconductor) camera, a CCD (Charge Coupled Device) camera or the like. Image pickup unit 110 outputs the picked up facial image to salesclerk's side terminal apparatus 200.

First display 120 is a liquid crystal display or an organic EL (organic electroluminescence) display being great enough in size to display the user's face at the actual scale, and displays a simulation image output from customer's side terminal apparatus 100. FIG. 2A shows an exemplary display mode of user's window containing simulation image 400. As shown in FIG. 2A, simulation image 400 includes facial image 410 picked up by image pickup unit 110, and table image 420 with which, for the makeup target-site (e.g., the eyes, the mouth, or the like, hereinafter referred to as the "facial component"), a color of a makeup item (lipstick in the example shown in FIG. 2A) can be selected. Here, 430 is a color image representing the color of the makeup item, the color being currently selected by the user.

First display 120 accepts operations of the user or the salesclerk on customer's side terminal apparatus 100. To this end, first display 120 is structured as a touchscreen monitor by a touchscreen being disposed to cover the window. Note that, the mechanism of accepting the operations of the user or the salesclerk is not specified to the touchscreen monitor, and a manipulation unit may be separately provided.

Salesclerk's side terminal apparatus 200 includes simulation image generator 210, simulation image output unit 220, interest degree sensor 230, interest degree information output unit 240, makeup candidate information output unit 250, second display 260, facial component positional information storage 270, facial position sensor 280, facial component specifier 290, determination unit 300, interest degree history information recorder 310, and interest degree history information storage 320.

Note that, while not shown in the drawings, salesclerk's side terminal apparatus 200 includes, for example, a CPU (Central Processing Unit) as a processor, a storage medium such as ROM (Read Only Memory) storing a control program (corresponding to the "makeup simulation assistance program" of the present disclosure), work memory such as RAM (Random Access Memory), and a communication circuit. In this case, the functions of the above-described units are realized by the CPU executing the control program.

In response to any operation of the user or the salesclerk on customer's side terminal apparatus 100, simulation image generator 210 generates a simulation image which is obtained by superimposing, on a facial image output from image pickup unit 110 of customer's side terminal apparatus 100, a makeup image showing the makeup state where makeup is applied on any facial component of the face contained in the facial image.

Simulation image output unit 220 outputs the simulation image generated by simulation image generator 210 to first display 120 of customer's side terminal apparatus 100.

Based on a facial image picked up by image pickup unit 110 when the simulation image is output from simulation image output unit 220, interest degree sensor 230 senses a match degree between a facial component in which the user is interested and a facial component corresponding to the makeup image contained in the simulation image, thereby sensing a user's interest degree for the makeup image.

Here, the match degree between the facial component in which the user is interested and the facial component corresponding to the makeup image contained in the simulation image refers to the degree relating to whether or not they match with each other in the type of the facial component (the eyes, the mouth, or the like). The facial component corresponding to the makeup image contained in the simulation image refers to a facial component strongly related to a makeup item (hereinafter referred to as the "makeup part", for example, lipstick, eyeshadow, blusher, and the like) applied on the facial image. For example, for lipstick, the mouth (lips) is the facial component strongly related, and for eyeshadow, the eyes are the facial components strongly related. Further, in the case there exist a plurality of facial components corresponding to the makeup image contained in the simulation image, based on the temporal relationship between the time point at which the facial component is displayed on the simulation image or the time point at which a change is made in the display, the matching degree as to part of the facial components may be determined. Note that, the facial components include eyes (right and left), the eyebrows (right and left), the eyelashes (right and left), the mouth, the lips (upper and lower), the teeth, the nose, the cheeks (right and left), the ears (right and left), the contour, the temples, the hair and the like. The facial components may be classified in more detail, such as corners of the mouth, around the mouth, around the eyes, and are not specified thereto.

Specifically, interest degree sensor 230 senses the interest degree for each facial component of the facial image contained in the simulation image. For example, interest degree sensor 230 senses, by any known means, a facial component positioned in the direction of the line of sight of the user, and senses that the interest degree of the facial component is greater as the accumulation time during which the directed line of sight stays is longer. FIG. 3 shows interest information temporarily generated by interest degree sensor 230 upon sensing the facial component positioned in the direction of the line of sight of the user. The interest information includes, as items, the date of visit of the user, the facial component, and the interest degree. The value in the item "interest degree" is set to "high" when the accumulation time during which the directed line of sight of the user stays is longer than a predetermined threshold value or relatively longer. On the other hand, the value in the item "interest degree" is set to "low" when the accumulation time during which the directed line of sight of the user stays is shorter than a predetermined threshold value or relatively shorter. In the example shown in FIG. 3, while the user's interest degree for the eyes is high, the user's interest degree for other facial components such as the nose, the cheeks, the lips, and the like is low. That is, it can be estimated that the user is potentially interested in the eyes while a makeup simulation of lipstick is being performed. Note that, the interest degree may not be a binary determination such as "high" and "low". In accordance with the length of the accumulation time, higher continuous values or non-continuous values may be set when the time is longer.

Note that, interest degree sensor 230 may sense, by any known means, the facial component of the face which is set to oppose to the image pickup unit 110 by the user, and may sense that the interest degree for the facial component is higher as the accumulation time during which the facial component is set opposite to image pickup unit 110 is longer. Further, interest degree sensor 230 may sense, by any known means, a deformation degree of a facial component caused by the user, and may sense that the interest degree for the facial component is higher as the deformation degree is higher. For example, when a makeup simulation for a plurality of facial components (for example, the eyes and the mouth) is being performed, when the deformation degree for around the mouth is high, it can be estimated that the user is interested in a makeup simulation of lipstick which is the makeup part for the mouth. Here, a deformation of a facial component may include: for the eyes, opening/closing the eyelids, shifting the line of sight, frowning and the like; and for the mouth, opening/closing the mouth, pursing, raising the corner of the mouth (smiling), lowering the corner of the mouth, licking the lips, puckering and the like. Further, a deformation of a facial component may include any action, such as placing a finger on a facial component. Still further, a deformation of a facial component is not specified to the foregoing.

Further, using an analysis result of the face features of the user and associating with the interest degree for each facial component of the facial image contained in the simulation image, interest degree sensor 230 can more precisely estimate an interest of the user such as a complex (feeling of inferiority).

Further, interest degree sensor 230 senses a satisfaction degree of the user for a makeup simulation (a makeup image) being performed. For example, interest degree sensor 230 may sense a reaction of the user immediately after a simulation image is displayed (after a lapse of or within a predetermined time, e.g., 10 seconds, at which a gut-reaction of the user is expected to appear, and the same will hold true hereinafter), to sense the satisfaction degree of the user in accordance with such a sensing result. More specifically, interest degree sensor 230 obtains the result in which the evaluation of the user (highly valued, poorly valued) is added to the interest degree. Interest degree sensor 230 records the sensed reactions of the user in chronological order.

The user's reaction includes the angle and the deformation amount of expression parameters (direction of the eyes, face), involuntary gestures, voices or conversations, and living signals such as the blood pressure or the heart rate of the user. For example, in the state where the seating position of the salesclerk is known, interest degree sensor 230 senses whether or not eye contact is established between the salesclerk and the user. Further, interest degree sensor 230 senses the angle of the user's face, to sense whether or not the user is looking down. Further, interest degree sensor 230 senses, as the user's involuntary gesture, whether or not the user is thinking carefully putting the user's hand on the face.

Interest degree information output unit 240 outputs, to second display 260, interest degree information indicative of the interest degree (including the satisfaction degree) sensed by interest degree sensor 230.

Based on the interest degree sensed by interest degree sensor 230, makeup candidate information output unit 250 outputs, to second display 260, makeup candidate information indicative of the candidate for makeup recommended to apply next. In the present exemplary embodiment, when the user's interest degree for a makeup image contained in the simulation image is high, makeup candidate information output unit 250 determines, as a candidate, makeup that corresponds to a facial component corresponding to the makeup image and that is different from makeup corresponding to the makeup image. On the other hand, when the user's interest degree is low, makeup candidate information output unit 250 determines, as a candidate, makeup for other facial component being different from the facial component corresponding to the makeup image.

Specifically, makeup candidate information output unit 250 determines the candidate for makeup recommended to apply next, according to: a key person, that is, the person who desired the process of generating the simulation image (which is specified by the determination result by determination unit 300); a facial component sensed by interest degree sensor 230 to show a high interest degree (hereinafter also referred to as the "interested portion"); and a user's satisfaction degree for the makeup simulation being performed sensed by interest degree sensor 230. Makeup candidate information output unit 250 determines the candidate for makeup recommended to apply next according to a makeup candidate determination table shown in FIG. 4.

FIG. 4 is the makeup candidate determination table according to the present exemplary embodiment. As shown in FIG. 4, when the key person is the user, the interested portion is a makeup portion (a facial component corresponding to the makeup image), and the satisfaction degree is high, makeup candidate information output unit 250 determines also as a candidate, in addition to the makeup for the makeup portion, makeup which is different from the makeup. Note that, when the key person is the user, the interested portion is a makeup portion, and the satisfaction degree is high, makeup candidate information output unit 250 desirably determines, as the makeup different from the makeup for the makeup portion, makeup being similar in color to the makeup for the makeup portion, that is, makeup which is smaller in difference as a candidate as compared to the case when the key person is the salesclerk.

Further, when the key person is the user, the interested portion is a makeup portion, and the satisfaction degree is low, makeup candidate information output unit 250 determines as a candidate, in place of the makeup for the makeup portion, makeup different from the makeup.

Still further, when the key person is the user, the interested portion is a non-makeup portion (a facial component being different from the facial component corresponding to the makeup image), and the satisfaction degree is high, makeup candidate information output unit 250 determines also as a candidate, in addition to the current makeup for the makeup portion, makeup for a facial component corresponding to the interested portion.

Still further, when the key person is the user, the interested portion is a non-makeup portion, and the satisfaction degree is low, makeup candidate information output unit 250 determines as a candidate, in place of the current makeup for the makeup portion, makeup for a facial component corresponding to the interested portion.

Still further, when the key person is the salesclerk, the interested portion is a makeup portion, and the satisfaction degree is high, makeup candidate information output unit 250 determines also as a candidate, in addition to the makeup for the makeup portion, makeup being different from the makeup.

Still further, when the key person is the salesclerk, the interested portion is a makeup portion, and a satisfaction degree is low, makeup candidate information output unit 250 determines as a candidate, in place of the makeup for the makeup portion, makeup being different from the makeup.

Still further, when the key person is the salesclerk, the interested portion is a non-makeup portion, and the satisfaction degree is high, makeup candidate information output unit 250 determines as a candidate, in addition to the current makeup for the makeup portion, makeup for a facial component corresponding to the interested portion.

Still further, when the key person is the salesclerk, the interested portion is a non-makeup portion, and the satisfaction degree is low, makeup candidate information output unit 250 determines as a candidate, in place of the current makeup for the makeup portion, makeup for a facial component corresponding to the interested portion.

Figure 2B:
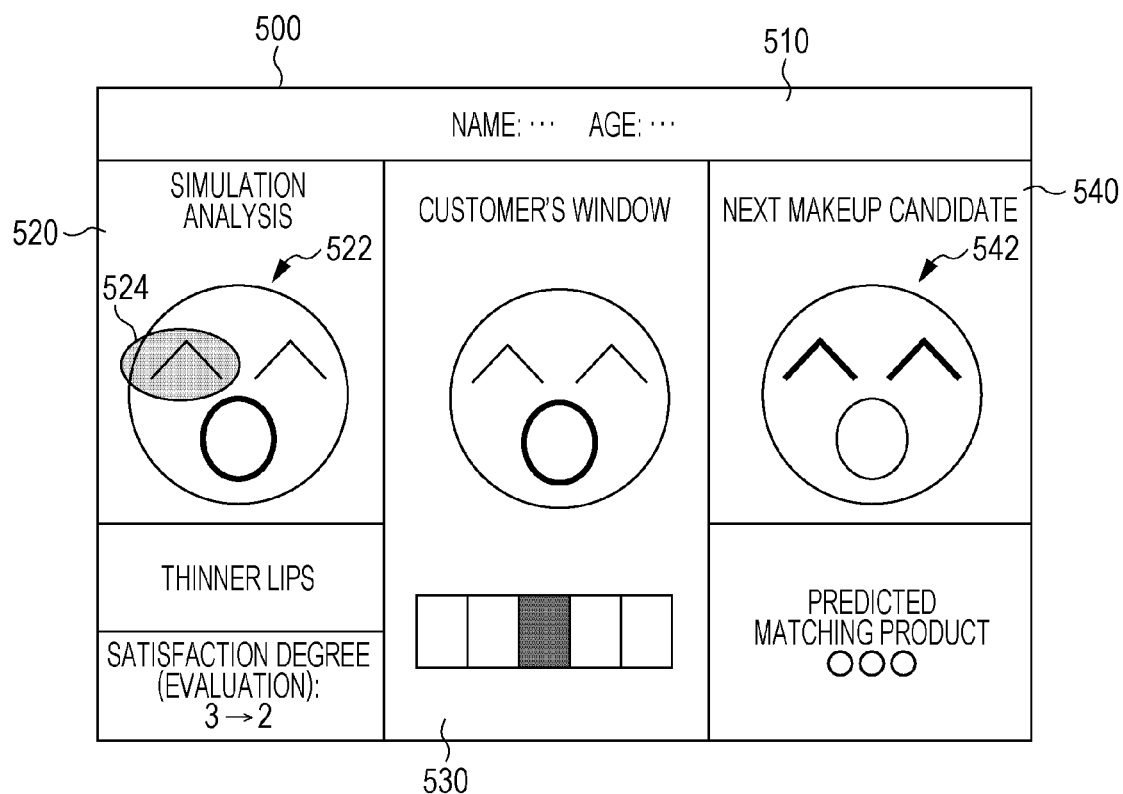
FIG. 2B is an exemplary display mode of a salesclerk's window in a makeup simulation.

Second display 260 is a liquid crystal display, an organic EL (organic electroluminescence) display or the like. Second display 260 displays a salesclerk's window containing an interest degree information image corresponding to the interest degree information output from interest degree information output unit 240, and a makeup candidate information image corresponding to the makeup candidate information output from makeup candidate information output unit 250. FIG. 2B is a diagram showing an exemplary display mode of salesclerk's window 500 containing interest degree information image 520 and makeup candidate information image 540. As shown in FIG. 2B, salesclerk's window 500 contains, in addition to interest degree information image 520 and makeup candidate information image 540, attribute information image 510 indicative of the user's attribute information (name, age and the like), simulation image 530 which is similar to simulation image 400 shown in FIG. 2A. Simulation image 400 and simulation image 530 are displayed while being updated in real time in synchronization with each other.

Interest degree information image 520 contains facial image 522 picked up by image pickup unit 110, and heat map image 524 emphasizing a facial component with which high interest degree is sensed by interest degree sensor 230. Further, interest degree information image 520 contains information (user's concern information such as thinner lips in the example shown in FIG. 2B) relating to the characteristic of a facial component (the lips in the example shown in FIG. 2B) corresponding to the makeup image contained in simulation image 530. The information relating to the characteristic of a facial component is generated based on the characteristic specified by facial component specifier 290. Further, interest degree information image 520 contains information relating to a change in the user's satisfaction degree for the makeup simulation being performed, sensed by interest degree sensor 230 (3→2 in the example shown in FIG. 2B). From the information contained in interest degree information image 520, the salesclerk can easily understand that the user's satisfaction degree for the makeup simulation being performed reduces, and the user's interested portion switches from the makeup portion (the lips) to the non-makeup portion (the eyes).

Makeup candidate information image 540 contains facial image 542 which is picked up by image pickup unit 110 and in which a candidate for makeup recommended by makeup candidate information output unit 250 to apply next is displayed as being enhanced (makeup for the eyes in the example shown in FIG. 2B). Further, in the present exemplary embodiment, makeup candidate information image 540 contains information indicative of a predicted matching product which is predicted to match with the makeup recommended to apply next (predicted matching product OOO in the example shown in FIG. 2B). Note that, makeup candidate information image 540 may contain information relating to makeup that can solve the user's concern indicated in the user's concern information contained in interest degree information image 520. Further, makeup candidate information image 540 may contain stock information of the predicted matching product (for example, in stock or out of stock, scheduled delivery, whether or not being strategically promoted, and the like). From the information contained in makeup candidate information image 540, the salesclerk can easily ascertain the candidate for makeup recommended to apply next.

Second display 260 accepts operations of the salesclerk on salesclerk's side terminal apparatus 200. To this end, second display 260 is structured as a touchscreen monitor by a touchscreen being disposed to cover the window.

In the present exemplary embodiment, as means for accepting operations of the salesclerk, in addition to the touchscreen monitor, a stylus (a manipulation unit) is separately provided. The stylus is provided with a discrimination button for discriminating whether the process of generating a simulation image by simulation image generator 210 is desired by the user or the salesclerk (guiding the user). For example, when the process of generating a simulation image by simulation image generator 210 is desired by the user, the salesclerk presses the discrimination button provided at the stylus.

Facial component positional information storage 270 stores facial component positional information indicative of the position and the like of facial components in the average face.

Facial position sensor 280 senses the position of facial components in the user's face based on a facial image picked up by image pickup unit 110 of customer's side terminal apparatus 100.

Based on the facial component positional information stored in facial component positional information storage 270 and the sensing result from facial position sensor 280, facial component specifier 290 specifies a facial component which is the characteristic of the user's face. For example, facial component specifier 290 may execute the scheme including: converting a facial component into a numerical value by the position in the face, the positional relationship with other facial component, the shape, the size, the color, and the like; comparing the obtained value against an average value of facial components in a certain number or greater similarly converted into values; and specifying a facial component with which a difference exceeding a predetermined threshold value is detected as a facial component with a characteristic. However, the present disclosure is not limited thereto. Makeup candidate information output unit 250 outputs, to second display 260, makeup candidate information indicative of makeup for the facial component specified by facial component specifier 290 as a candidate for makeup recommended to apply next.

Determination unit 300 determines whether or not the process of generating the simulation image performed by simulation image generator 210 is desired by the user, in accordance with whether or not the discrimination button provided at the stylus is pressed. Note that, determination unit 300 may determine whether or not the process of generating the simulation image performed by simulation image generator 210 is desired by the user based on the analysis result on the conversation between the user and the salesclerk.

When determination unit 300 determines that the process of generating the simulation image is not desired by the user (that is, guided by the salesclerk), interest degree history information recorder 310 stores, in interest degree history information storage 320, interest degree history information in which the facial component corresponding to the makeup image contained in the simulation image and the interest degree sensed by interest degree sensor 230 in the current makeup simulation are associated with each other.

FIG. 5A is a table showing the interest degree history information according to the present exemplary embodiment. As shown in FIG. 5A, interest degree history information includes, as items, the date of visit, the makeup part of a facial component corresponding to a makeup image, the color of the makeup part, the user's satisfaction degree for makeup corresponding to the makeup image, and the final purchase result for cosmetics corresponding to the makeup part. In the present exemplary embodiment, as the value in the item "satisfaction degree", one integer value out of 1 to 5 is set. Further, as the value in the item "purchase result", the mark indicative of purchase "○", or the mark indicative of non-purchase "x" is set. Note that, as shown in FIG. 5B, interest degree history information recorder 310 may store, irrespective of whether or not the process of generating the simulation image is desired by the user which is determined by determination unit 300, the interest degree history information of the current makeup simulation in interest degree history information storage 320.

As shown in FIGS. 5A and 5B, from the interest degree history information relating to the key person "salesclerk", since the satisfaction degree is higher with blusher than other makeup part "lipstick", it can be estimated that the user is following the guidance of the salesclerk. Further, as shown in FIG. 5B, from the interest degree history information relating to the makeup part "lipstick", since the satisfaction degree is higher with the key person "user" than other key person "salesclerk", it can be estimated that the user is inflexible about lipstick, and particularly shows strong preference for pink. Further, as shown in FIG. 5B, from the interest degree history information relating to the makeup part "lipstick", the key person "user", the satisfaction degree "5", and the purchase result "x", it can be estimated that, on the next visit of the user, it would be productive to recommend "pink" color when lipstick becomes a conversation piece. As has been described above, by analyzing the interest degree history information, the user's flexibility about any makeup part (whether the user willingly follows the guidance of the salesclerk or becomes obstinate and inflexible) can be learned. Further, the user's flexibility about the color of any makeup part can be learned. Note that, it is also possible to analyze the probability of the user following the makeup guided by the salesclerk for each makeup part and each color (the user's flexibility), and the analysis result may be displayed on second display 260. Further, in the case of non-purchase of the makeup part on the previous visit of the user, this fact may be displayed on second display 260 together with the analysis result.

Figure 6:
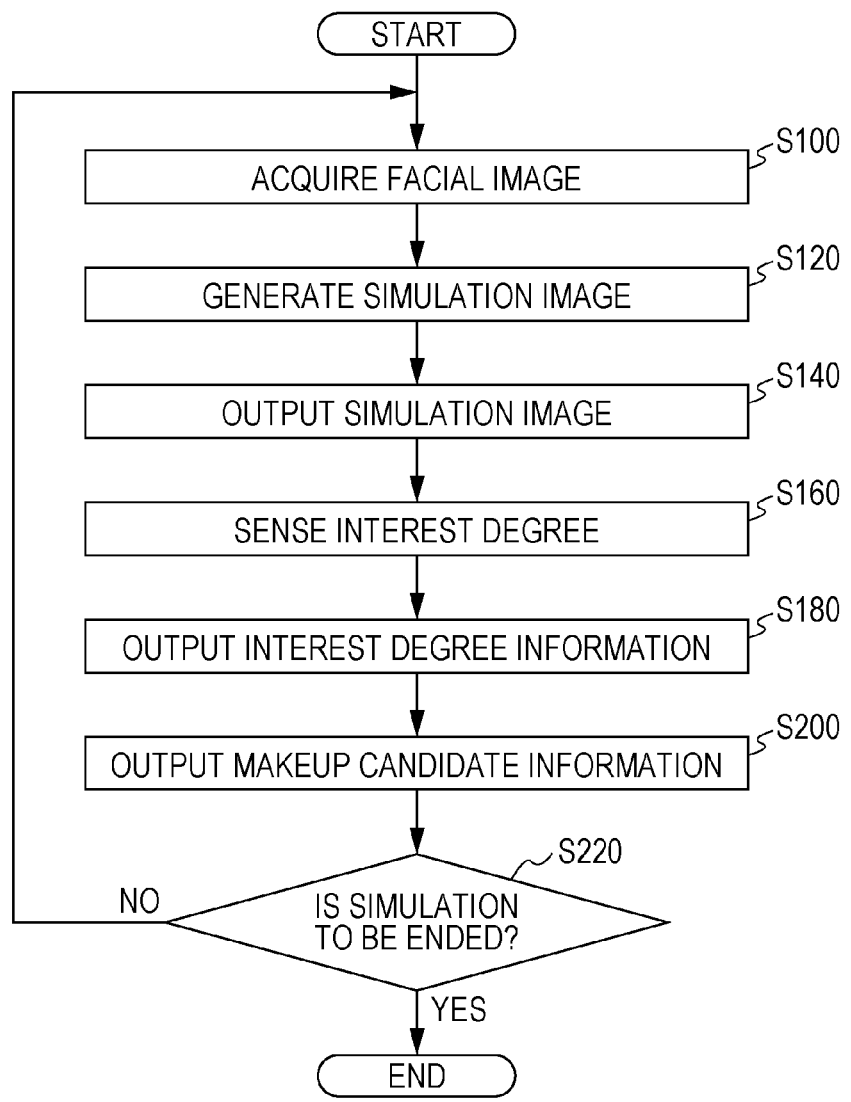
FIG. 6 is a flowchart showing an operation of a salesclerk's side terminal apparatus according to the present exemplary embodiment.

FIG. 6 is a flowchart showing an operation of salesclerk's side terminal apparatus 200 according to the present exemplary embodiment (corresponding to the "makeup simulation assistance method" of the present disclosure). The process shown in FIG. 6 starts in response to an execution request for a makeup simulation based on a manipulation of the user or the salesclerk on customer's side terminal apparatus 100.

Firstly, simulation image generator 210 acquires a facial image output from image pickup unit 110 of customer's side terminal apparatus 100 (step S100). Next, simulation image generator 210 generates a simulation image obtained by superimposing, on the acquired facial image, a makeup image representing the state of makeup applied to a facial component of the face contained in the acquired facial image (step S120).

Next, simulation image output unit 220 outputs the simulation image generated by simulation image generator 210 to first display 120 of customer's side terminal apparatus 100 (step S140). First display 120 displays the simulation image output from customer's side terminal apparatus 100.

Next, interest degree sensor 230 senses, based on a facial image picked up by image pickup unit 110 when the simulation image is output from simulation image output unit 220, the user's interest degree for the makeup image contained in the simulation image (step S160).

Next, interest degree information output unit 240 outputs, to second display 260, interest degree information indicative of the interest degree sensed by interest degree sensor 230 (step S180). Next, based on the interest degree sensed by interest degree sensor 230, makeup candidate information output unit 250 outputs, to second display 260, makeup candidate information indicative of a candidate for makeup recommended to apply next (step S200). Second display 260 displays the interest degree information output from interest degree information output unit 240, and the makeup candidate information output from makeup candidate information output unit 250.

Finally, salesclerk's side terminal apparatus 200 determines whether or not an end request for the makeup simulation has occurred based on a manipulation of the user or the salesclerk (step S220). As a result of the determination, when the end request for the makeup simulation has not occurred (step S220, NO), the process returns so as to precede step S100. On the other hand, when the end request for the makeup simulation has occurred (step S220, YES), salesclerk's side terminal apparatus 200 ends the process in FIG. 6.

As has been described in detail above, salesclerk's side terminal apparatus 200 (the makeup simulation assistance apparatus) according to the present exemplary embodiment includes: simulation image generator 210 that generates a simulation image obtained by superimposing, on a facial image picked up by image pickup unit 110 that picks up an image of a face of a user as the facial image, a makeup image showing a state of makeup as being applied to a facial component of the face; a simulation image output unit 220 that outputs the simulation image being generated; interest degree sensor 230 that senses an interest degree of the user for the makeup image, based on a facial image picked up by image pickup unit 110 when the simulation image is output; and interest degree information output unit 240 that outputs interest degree information indicative of the interest degree being sensed.

With the present exemplary embodiment configured as above, when a simulation image is displayed, customer's side terminal apparatus 100 identifies latent needs of the user (customer) for makeup, for example, hidden honest feeling or complex (feeling of inferiority), and provides the salesclerk with information (interest degree information) which is helpful in providing information that the user truly needs. Thus, the present exemplary embodiment can assist in face-to-face selling, to efficiently lead the customer to purchase of products relating to makeup (cosmetics).

Note that, in the above-described exemplary embodiment, while the description has been given of the case where customer's side terminal apparatus 100 and salesclerk's side terminal apparatus 200 are separately embodied, they may be integrally embodied as one apparatus. In this case, one display may serve as both first display 120 and second display 260, and the CPUs as the processors may be one in number. When two CPUs are used, functions such as generating and displaying a simulation image and an analysis such as sensing an interest degree may be separately allotted to the CPUs.

Further, in the above-described exemplary embodiment, customer's side terminal apparatus 100 may include, out of the elements of salesclerk's side terminal apparatus 200, the elements other than second display 260. In this case, customer's side terminal apparatus 100 corresponds to the "makeup simulation assistance apparatus" of the present disclosure.

Still further, in above-described exemplary embodiment, makeup candidate information image 540 may include, based on the interest degree history information and the like stored in interest degree history information storage 320, information relating to a candidate for makeup suitable for the characteristic of the user's face (for example, enhancement for the eyes), or information indicative of past user's inflexibility (for example, strong interest in color ○○).

Figure 7A:
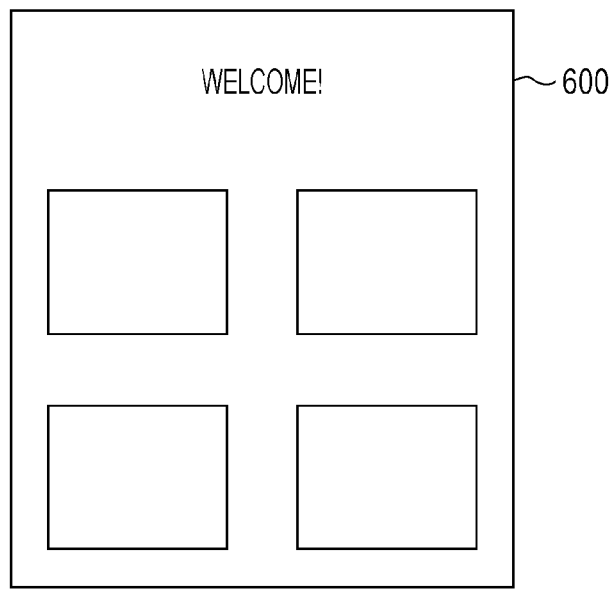
FIG. 7A is an exemplary display mode of the user's window at the start of face-to-face selling.

Still further, in the above-described exemplary embodiment, when face-to-face selling is started, the analysis result of the user according to the interest degree history information stored in interest degree history information storage 320 may be displayed on second display 260. FIG. 7A shows an exemplary display mode of user's window 600 at the start of face-to-face selling. As shown in FIG. 7A, the user's window displays, for example, a general advertisement relating to cosmetics, or in consideration of the user, information relating to cosmetics that may attract the user.

Figure 7B:
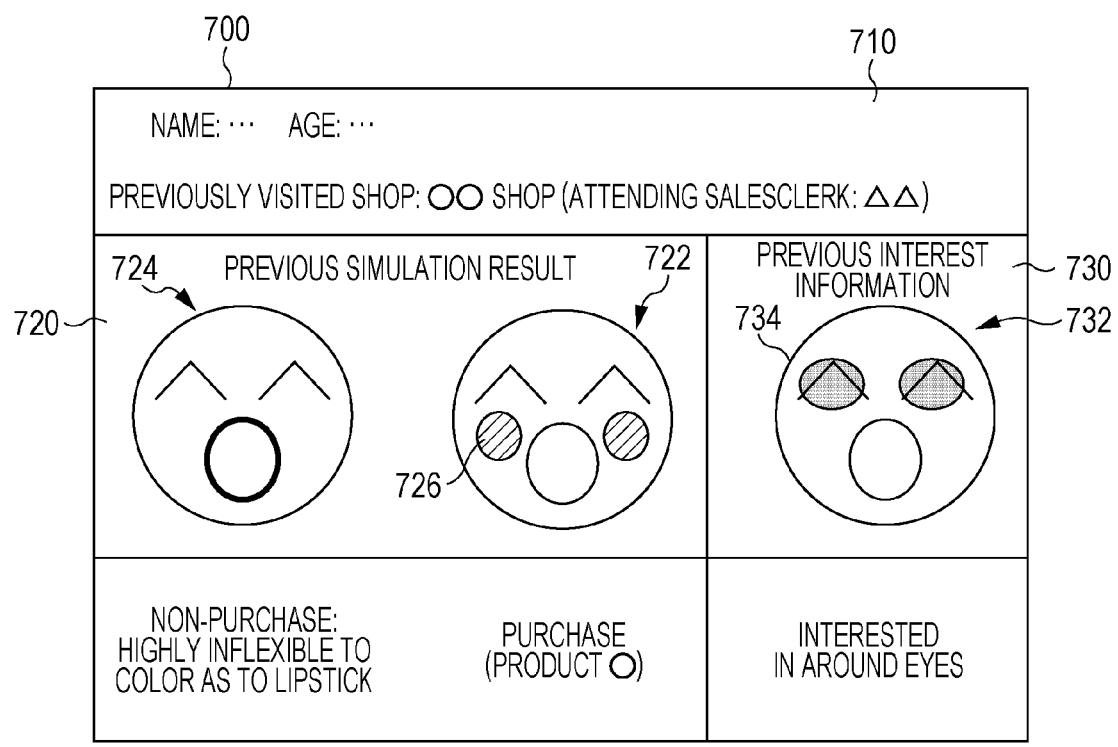
FIG. 7B is an exemplary display mode of the salesclerk's window at the start of face-to-face selling.

FIG. 7B shows an exemplary display mode of salesclerk's window 700 at the start of face-to-face selling. As shown in FIG. 7B, the salesclerk's window displays attribute information image 710 indicative of the user's attribute information (name, age, previously visited shop, the attending salesclerk, and the like), previous simulation result image 720 showing the result of the previous makeup simulation, and previous interest information image 730 showing the user's interest in the previous makeup simulation.

The attribute information displayed on attribute information image 710 is desirably information retrieved using the facial image picked up by image pickup unit 110. At the start of face-to-face selling, the salesclerk meticulously asking the user about the customer's information from the beginning (such as the name and the age) may be offensive to the user.

Previous simulation result image 720 contains user's facial image 724 with makeup with a makeup part which shows non-purchase as the purchase result in the previous makeup simulation (lipstick in the example shown in FIG. 7B), and user's facial image 722 with makeup with a makeup part which shows purchase as the purchase result (blusher in the example shown in FIG. 7B). Facial image 722 contains enhanced image 726 which enhances makeup with a makeup part. Further, previous simulation result image 720 also contains information relating to a non-purchase reason (great inflexibility as to color for lipstick, in the example shown in FIG. 7B), information showing a specific product name of the purchased product (○ in the example shown in FIG. 7B).

Previous interest information image 730 contains user's facial image 732 containing enhanced image 734 which enhances a facial component with which the user's interest degree has been high, and information indicative of the fact that the interest degree for the facial component has been high (interested around the eyes, in the example shown in FIG. 7B).

At the start of the face-to-face selling, by glancing over salesclerk's window 700, the salesclerk can note cautions in the current makeup simulation before actually starting the makeup simulation, to efficiently lead the customer to purchase of cosmetics. In particular, also in the case where the attending salesclerk in a makeup simulation is switched between the previous simulation and the current simulation from, for example, an experienced salesclerk to an inexperienced salesclerk, a makeup simulation reflecting the previous makeup simulation result can be performed.

Further, in the above-described exemplary embodiment, the correlation between the user's reaction immediately after a simulation image is displayed and the purchase result may be learned for each user, and the analysis result according to the learning result may be displayed on second display 260. The correlation between the user's reaction and the purchase result may be learned for each salesclerk.

Specifically, interest degree sensor 230 senses and records the user's reaction immediately after a simulation image is displayed. Then, when there exist a plurality of purchase occasions during a past visit of the user, interest degree sensor 230 detects the difference between the user's reactions between a makeup simulation execution mode relating to cosmetics resulting in purchase and a makeup simulation execution mode relating to cosmetics not resulting in purchase, and extracts a user's reaction exhibiting high correlation with purchase as a high evaluation sensing standard. When the extracted high evaluation sensing standard is also sensed in a makeup simulation currently performed, interest degree sensor 230 notifies the makeup candidate information output unit 250 of the same. Then, the user's reaction corresponding to the high evaluation sensing standard (a facial component deformation), that is, the portion to be observed by the salesclerk, is displayed on second display 260 (more specifically, with a dotted frame on facial image 522 contained in interest degree information image 520). Note that, the high evaluation sensing standard may be displayed on the salesclerk's window as it is. Further, a user's reaction exhibiting high correlation with purchase may be determined by, for example, a lapse of time since displaying a simulation image, such as a user's eye contact after a lapse of what seconds results in purchase. Further, a user's reaction exhibiting high correlation with purchase may be correlated with a plurality of users having similar facial characteristics.

Figure 8:
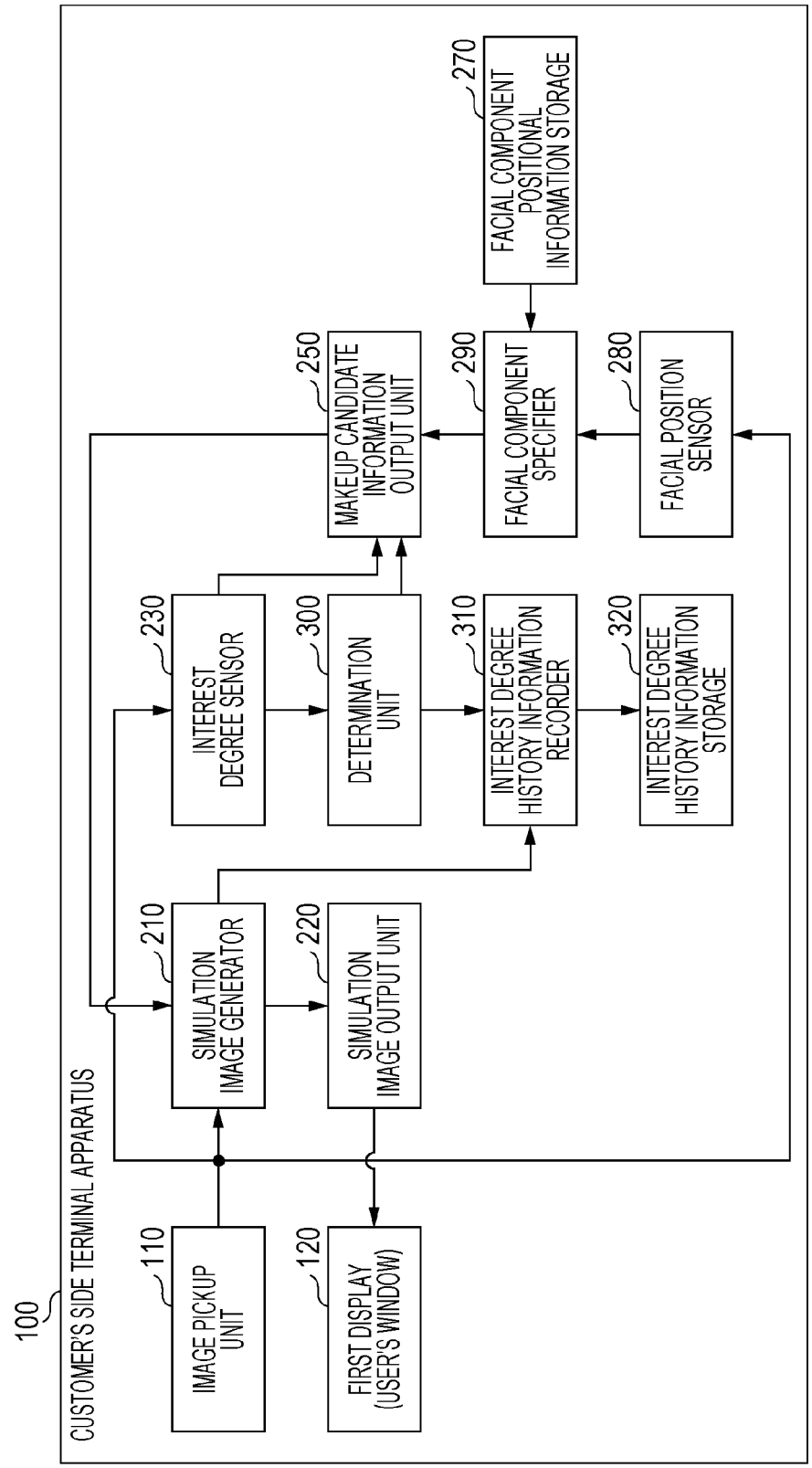
FIG. 8 is a block diagram showing a functional configuration of the makeup simulation system in no-salesclerk-selling according to the present exemplary embodiment.

In the above-described exemplary embodiment, a makeup simulation using customer's side terminal apparatus 100 may be performed at a retail cosmetics shop where face-to-face selling is performed, at a retail cosmetics shop where the customer determines purchase on his/her own, or at the home of the user. FIG. 8 shows a system configuration of the latter two cases (no-salesclerk-selling). Being different from FIG. 1, no salesclerk is present, and therefore no second display (salesclerk's window) is provided. The makeup simulation to be performed next is determined by makeup candidate information output unit 250 without seeking salesclerk's final judgement, and the determination result is transmitted to simulation image generator 210. Desirably, the content of the makeup simulation is updated reflecting the sensing status of the customer's interest degree, for example at an interval of about 15 seconds. On the other hand, when there exists any makeup simulation that the customer is interested in, the updating may be temporarily suspended by any customer's manipulation such as touching. Further, the customer may change the content of the simulation such as color. Determination unit 300 determines whether such a content of the makeup simulation performed next is determined by system 10 according to the present exemplary embodiment or by the customer. Similarly to the discriminating whether the "user" or the "salesclerk" is the key person in face-to-face selling shown in FIGS. 5 and 6, this information is used in discriminating whether the key person is the "user" or not, and as described above, in determining the preference of the customer or the user's flexibility.

Further, in this case, considering that the user's reaction in a makeup simulation is assumed to vary depending on whether a makeup simulation using customer's side terminal apparatus 100 is performed at a retail cosmetics shop or at the home of the user, the method of sensing the user's interest degree by interest degree sensor 230 may be changed. Further, the method of sensing the user's interest degree by interest degree sensor 230 may be changed depending on whether or not a makeup simulation is performed in a time slot (for example, at nighttime, before going to bed) in which the user's latent needs (honest feeling) tend to appear as a facial expression.

Still further, in the above-described exemplary embodiment, not only the user's face but also the whole body can be displayed on first display 120. When any clothes or hairstyle are positioned in the direction of the line of sight of the user, the information indicative of the same may be contained in interest degree information image 520. Further, in the above-described exemplary embodiment, while the target of a simulation is just makeup in which makeup is virtually realized, the target of a simulation may be virtual coordination including a hairstyle and an outfit. When the target of a simulation is wider, it becomes more important to ascertain the interest and reactions of the customer and determine the next action.

Still further, in the above-described exemplary embodiment, a makeup simulation may be measured for each facial component, and the correlation with the purchase result for each facial component (for example, a purchase failed to be made despite an extended performance of a makeup simulation) may be recorded. Further, by extracting the time slot which shows correlation with the purchase result, information that makes it possible to search for the salesclerk to whom the user can easily (in short time) express his/her honest feeling may be recorded.

Still further, a plurality of facial images may be picked up for each makeup simulation (for example, an image of a smiling face, a face of a beauty, and the like), so that the salesclerk can select the facial image to be contained in a purchase candidate presenting window which is displayed after a makeup simulation.

Still further, in the above-described exemplary embodiment, while the description has been given of an exemplary case where makeup simulation system 10 is used for identifying the user's interest (latent needs) for makeup, the present disclosure is not limited thereto. For example, makeup simulation system 10 may be used for analyzing cosmetics used in makeup. More specifically, makeup simulation system 10 may be used for analyzing whether a cosmetic item is expected to be purchased by any user, whether a cosmetic item has been purchased beyond all expectations irrespective of the characteristics of the face, the user's flexibility, and the like upon recommendation of a salesclerk, and the like. Further, makeup simulation system 10 may be used for analyzing a salesclerk. More specifically, makeup simulation system 10 may be used for analyzing whether or not the salesclerk is skilled in attracting interest of the user through a makeup simulation, whether or not the communication skill of the salesclerk beaten low interest of the user and led to purchase, compensating for the low evaluation in the makeup simulation mode, and the like.

Still further, the above-described exemplary embodiment is merely an exemplary embodiment in practicing the present disclosure, and the technical range of the present disclosure should not be construed as limiting thereby. That is, the present disclosure can be practiced in any of various modes without departing from its spirit or its principle characteristics.

A makeup simulation assistance apparatus of the present disclosure includes:

a simulation image generator that generates a simulation image obtained by superimposing, on a facial image picked up by an image pickup unit that picks up an image of a face of a user as the facial image, a makeup image showing a state of makeup as being applied to a facial component of the face;

a simulation image output unit that outputs the simulation image being generated;

an interest degree sensor that senses an interest degree of the user for the makeup image, based on a facial image picked up when the simulation image is output; and an interest degree information output unit that outputs interest degree information indicative of the interest degree being sensed.

In the makeup simulation assistance apparatus, the interest degree sensor may sense the interest degree of the user by sensing a match degree between a facial component in which the user is interested and a facial component corresponding to the makeup image, based on the facial image picked up when the simulation image is output.

In the makeup simulation assistance apparatus, the interest degree may include a satisfaction degree of the user for the makeup image.

The makeup simulation assistance apparatus may further include a makeup candidate information output unit that outputs makeup candidate information indicative of a candidate for makeup recommended to apply next, based on the interest degree being sensed.

In the makeup simulation assistance apparatus, the makeup candidate information output unit may output, when the interest degree is high, makeup candidate information indicative of makeup for the facial component and being different from makeup corresponding to the makeup image as the candidate, and the makeup candidate information output unit outputs, when the interest degree is low, makeup candidate information indicative of makeup for a facial component different from the facial component as the candidate.

The makeup simulation assistance apparatus may further include:

a facial component positional information storage that stores facial component positional information indicative of a position of a facial component in an average face;

a facial position sensor that senses a position of a facial component in the face of the user based on the facial image being picked up; and a facial component specifier that specifies a facial component being a characteristic of the face of the user based on the facial component positional information and a sensing result of the facial position sensor, wherein the makeup candidate information output unit may output makeup candidate information indicative of makeup for the facial component being specified as the candidate.

In the makeup simulation assistance apparatus, the interest degree information output unit may output the interest degree information to a second display that is different from a first display to which the simulation image is output.

In the makeup simulation assistance apparatus, the interest degree sensor may sense a facial component of the face which is set to oppose to the image pickup unit by the user, and the interest degree may be sensed based on a sensing result of the sensing.

In the makeup simulation assistance apparatus, the interest degree sensor may sense, out of facial components of the face displayed in the simulation image, a facial component positioned in a direction of a line of sight of the user, and may sense the interest degree based on a sensing result of the sensing.

The makeup simulation assistance apparatus may further include:

a determination unit that determines whether or not the generating the simulation image by the simulation image generator is desired by the user; and an interest degree history information recorder that stores, in an interest degree history information storage when the determination unit determines that the generating is not desired by the user, interest degree history information in which a facial component corresponding to the makeup image and the interest degree being sensed are associated with each other.

In the makeup simulation assistance apparatus, the determination unit may determine a user's flexibility being a probability of the user following guidance of other person, based on the interest degree history information and a purchase result, and the interest degree information output unit may output a determination result relating to the user's flexibility.

In the makeup simulation assistance apparatus, the interest degree sensor may extract information relating to deformation of a facial component based on the facial image picked up, acquire correlation between the extracted information relating to deformation of the facial component after a lapse of a predetermined time since the simulation image is output from the simulation image output unit and a purchase result, and may extract, based on the acquired correlation with a purchase result, deformation of the facial component showing correlation of at least a predetermined value with purchase and non-purchase as a high evaluation sensing standard and a low evaluation sensing standard, respectively.

A makeup simulation assistance method of the present disclosure includes:

generating a simulation image obtained by superimposing, on a facial image picked up by an image pickup unit that picks up an image of a face of a user as the facial image, a makeup image showing a state of makeup as being applied to a facial component of the face;

outputting the simulation image being generated;

sensing an interest degree of the user for the makeup image, based on a facial image picked up when the simulation image is output; and outputting interest degree information indicative of the interest degree being sensed.

The present disclosure provides a non-transitory computer-readable recording medium storing a makeup simulation assistance program causing a computer to execute the steps of:

generating a simulation image obtained by superimposing, on a facial image picked up by an image pickup unit that picks up an image of a face of a user as the facial image, a makeup image showing a state of makeup as being applied to a facial component of the face;

outputting the simulation image being generated;

sensing an interest degree of the user for the makeup image, based on the facial image picked up when the simulation image is output; and outputting interest degree information indicative of the interest degree being sensed.

The present disclosure is useful as a makeup simulation assistance apparatus, a makeup simulation assistance method, and a non-transitory computer-readable recording medium storing a makeup simulation assistance program each assisting in face-to-face selling and no-salesclerk-selling in order to efficiently derive purchase of a product relating to makeup.

What is claimed is:

1. A makeup simulation assistance apparatus comprising:
a simulation image generator that generates a simulation image obtained by superimposing, on a facial image picked up by an image pickup unit that picks up an image of a face of a user as the facial image, a makeup image showing a state of makeup as being applied to a facial component of the face;
a simulation image output unit that outputs the simulation image being generated to a first display;
an interest degree sensor that senses an interest degree of the user for the makeup image, based on a facial image picked up when the simulation image is output;
an interest degree information output unit that outputs, to a second display, interest degree information indicative of the interest degree being sensed;
a determination unit that determines whether or not the generated simulation image generated by the simulation image generator is desired by the user;
an interest degree history information recorder that stores, in an interest degree history information storage when the determination unit determines that the generating is not desired by the user, interest degree history information in which a facial component corresponding to the makeup image and the interest degree being sensed are associated with each other; and
a makeup candidate information output unit that outputs, to the second display, makeup candidate information indicative of a candidate for makeup recommended to apply next, based on the interest degree being sensed.

2. The makeup simulation assistance apparatus according to claim 1, wherein the interest degree sensor senses the interest degree of the user by sensing a match degree between a facial component in which the user is interested and the facial component corresponding to the makeup image, based on the facial image picked up when the simulation image is output.

3. The makeup simulation assistance apparatus according to claim 1, wherein the interest degree includes a satisfaction degree of the user for the makeup image.

4. The makeup simulation assistance apparatus according to claim 1, wherein the makeup candidate information output unit outputs, when the interest degree is high, makeup candidate information indicative of makeup for the facial component and being different from makeup corresponding to the makeup image as the candidate, and the makeup candidate information output unit outputs, when the interest degree is low, makeup candidate information indicative of makeup for a facial component different from the facial component as the candidate.

5. The makeup simulation assistance apparatus according to claim 1, further comprising:
a facial component positional information storage that stores facial component positional information indicative of a position of a facial component in an average face;
a facial position sensor that senses a position of the facial component in the face of the user based on the facial image being picked up; and
a facial component specifier that specifies the facial component as being a facial component characteristic of the face of the user based on the facial component positional information and a sensing result of the facial position sensor, wherein the makeup candidate information output unit outputs makeup candidate information indicative of makeup for the facial component being specified as the candidate.

6. The makeup simulation assistance apparatus according to claim 1, wherein the interest degree information output unit outputs the interest degree information to the second display that is different from the first display to which the simulation image is output.

7. The makeup simulation assistance apparatus according to claim 1, wherein the interest degree sensor senses the facial component of the face and is is manually settable to oppose the image pickup unit, and the interest degree is sensed based on a sensing result of the sensing performed by the interest degree sensor.

8. The makeup simulation assistance apparatus according to claim 1, wherein the interest degree sensor senses, out of facial components of the face displayed in the simulation image, a facial component positioned in a direction of a line of sight of the user, and senses the interest degree based on a sensing result of the sensing performed by the interest degree sensor.

9. The makeup simulation assistance apparatus according to claim 1, wherein
the determination unit determines a probability of the user following a makeup guidance of another person, based on the interest degree history information and a purchase result, and
the interest degree information output unit outputs a determination result relating to the probability.

10. The makeup simulation assistance apparatus according to claim 1, wherein the interest degree sensor
extracts information relating to deformation of the facial component based on the facial image picked up by the image pickup unit,
acquires a correlation between the extracted information relating to deformation of the facial component after a lapse of a predetermined time since the simulation image is output from the simulation image output unit and a purchase result, and
extracts, based on the acquired correlation with the purchase result, a deformation of the facial component showing a high correlation of at least a predetermined value with a makeup purchase as a high evaluation sensing standard, and extracts, based on the acquired correlation with the purchase result, a deformation of the facial component showing a low correlation, lower than the high correlation, with a non-purchase of makeup as the purchase result, as a low evaluation sensing standard.

11. A makeup simulation assistance method comprising:
generating a simulation image obtained by superimposing, on a facial image picked up by an image pickup unit that picks up an image of a face of a user as the facial image, a makeup image showing a state of makeup as being applied to a facial component of the face;
outputting the simulation image being generated to a first display;
sensing an interest degree of the user for the makeup image, based on a facial image picked up when the simulation image is output;
outputting interest degree information indicative of the interest degree being sensed to a second display;
determining whether or not the generating the simulation image is desired by the user;
storing, in an interest degree history information storage when the generating is not desired by the user, interest degree history information in which a facial component corresponding to the makeup image and the interest degree being sensed are associated with each other; and
outputting, to the second display, makeup candidate information indicative of a candidate for makeup recommended to apply next, based on the interest degree being sensed.

12. A non-transitory computer-readable recording medium storing a makeup simulation assistance program causing a computer to execute the steps of:
- generating a simulation image obtained by superimposing, on a facial image picked up by an image pickup unit that picks up an image of a face of a user as the facial image, a makeup image showing a state of makeup as being applied to a facial component of the face;
- outputting the simulation image being generated to a first display;
- sensing an interest degree of the user for the makeup image, based on the facial image picked up when the simulation image is output;
- outputting interest degree information indicative of the interest degree being sensed to a second display;
- determining whether or not the generating the simulation image is desired by the user;
- storing, in an interest degree history information storage when the generating is not desired by the user, interest degree history information in which a facial component corresponding to the makeup image and the interest degree being sensed are associated with each other; and
- outputting, to the second display, makeup candidate information indicative of a candidate for makeup recommended to apply next, based on the interest degree being sensed.

* * * * *

UNITED STATES PATENT AND TRADEMARK OFFICE
CERTIFICATE OF CORRECTION

PATENT NO. : 10,559,102 B2
APPLICATION NO. : 15/975876
DATED : February 11, 2020
INVENTOR(S) : H. Taoka et al.

It is certified that error appears in the above-identified patent and that said Letters Patent is hereby corrected as shown below:

Column 18, Line 3 (Claim 7, Line 3) please change "and is is manually settable" to -- and is manually settable --

Signed and Sealed this
Seventh Day of April, 2020

Andrei Iancu
*Director of the United States Patent and Trademark Office*